(12) United States Patent
Hinz et al.

(10) Patent No.: US 7,244,097 B2
(45) Date of Patent: Jul. 17, 2007

(54) DEVICE FOR ADJUSTING THE ANGLE OF INCIDENCE OF A ROTOR BLADE OF A WIND POWER INSTALLATION

(75) Inventors: Uwe Hinz, Weddingstedt (DE); Ernst Wilhelm Ramundt, Albersdorf (DE)

(73) Assignee: Repower Systems AG, Hamburg (DE)

( * ) Notice: Subject to any disclaimer, the term of this patent is extended or adjusted under 35 U.S.C. 154(b) by 0 days.

(21) Appl. No.: 10/556,312

(22) PCT Filed: May 14, 2004

(86) PCT No.: PCT/EP2004/005224

§ 371 (c)(1),
(2), (4) Date: Nov. 10, 2005

(87) PCT Pub. No.: WO2004/101989

PCT Pub. Date: Nov. 25, 2004

(65) Prior Publication Data

US 2006/0204360 A1 Sep. 14, 2006

(30) Foreign Application Priority Data

May 14, 2003 (DE) ................. 103 21 535

(51) Int. Cl.
*F03D 11/00* (2006.01)
*F16H 57/04* (2006.01)
(52) U.S. Cl. .................. 415/122.1; 415/175; 416/174
(58) Field of Classification Search ............. 415/122.1, 415/124.1, 175; 416/130, 157 B, 170 R, 416/174

See application file for complete search history.

(56) References Cited

U.S. PATENT DOCUMENTS 4,006,925 A * 2/1977 Scherer ....................... 290/55
4,088,420 A * 5/1978 Jacobs et al. ................. 416/9

(Continued)

FOREIGN PATENT DOCUMENTS

CA 2457032 A1 3/2003

(Continued)

OTHER PUBLICATIONS

Biesler, Thomas; "Zentralschmieranlagen in Windkraftantagen"; Erneuerbare Energien; Jun. 2002, XP002299011; Hannover; (Retrieved from the Internet: URL: http://www.erneuerbareenergien.de/0602/wind.html; (Reference discussed in specification).

*Primary Examiner*—Igor Kershteyn
(74) *Attorney, Agent, or Firm*—Rankin, Hill, Porter & Clark LLP (57) ABSTRACT

A device for the targeted adjustment of the angle of incidence of a rotor blade (13) which is rotatably mounted, at the foot (14) thereof, on a hub (12) of a rotor (11) of a wind power installation (10). The device includes a gearing, a driving toothed wheel (21, 41) that meshes with the gearing (20, 40), and a lubricating device. The lubricating device, due to a temporary displacement of the driving toothed wheel (21, 41) from an operating position into a lubricating position, can be engaged with a defined point of the gearing (20) or the driving toothed wheel (41), respectively previously engaged with the driving toothed wheel (1) or the gearing (20, 40), so as to transfer lubricant.

12 Claims, 4 Drawing Sheets

U.S. PATENT DOCUMENTS

| | | | |
|---|---|---|---|
| 4,364,708 A | * 12/1982 | David | 416/132 B |
| 5,954,479 A | * 9/1999 | Smith | 416/125 |
| 6,676,379 B2 | * 1/2004 | Eccles et al. | 416/170 R |
| 2003/0116970 A1 | 6/2003 | Weitkamp et al. | |

FOREIGN PATENT DOCUMENTS

| | | |
|---|---|---|
| DE | 195 11 765 A1 | 10/1996 |
| DE | 201 09 586 U1 | 11/2001 |
| DE | 101 40 793 A1 | 3/2003 |
| DE | 101 41 667 A1 | 3/2003 |
| DE | 101 29 089 A1 | 4/2003 |
| FR | 1 541 597 | 10/1968 |

* cited by examiner

DEVICE FOR ADJUSTING THE ANGLE OF INCIDENCE OF A ROTOR BLADE OF A WIND POWER INSTALLATION

BACKGROUND OF THE INVENTION

This invention relates to a device for adjusting the angle of incidence of a rotor blade of a wind power installation.

In known devices, the rotor blade is rotatably mounted on a hub of the rotor of the wind power installation such that it can be adjusted in its angle of incidence—via a gearing provided in the area of its blade foot, said gearing being aligned essentially transversely to the longitudinal axis of the rotor blade—by means of a driving toothed wheel rotatably mounted on the hub and meshing with the gearing. However, the reverse arrangement is actually also known, namely that the hub can comprise the gearing and the driving toothed wheel being rotatably mounted on the rotor blade. In the same manner, there are arrangements with hydraulic rotary drives or cylinders whose linear movement is converted into a rotational movement by means of coupling bars.

The above mentioned open tooth-wheel drives for the adjustment of the angle of incidence of a rotor blade of a wind power installation are known, e.g. from DE 10140793. Here, the driving toothed wheel is driven by an electric motor and arrested, as a rule, by brakes located on the driving shaft. Due to the arresting of the driving toothed wheel, the rotor blade is also arrested in the desired angle of incidence.

As a rule, open tooth-wheel drives can be lubricated without any further problems since they utilize the entire available rotary area within the course of a given interval, and accordingly, all areas of the gearing can be regularly brought into contact with a lubricating device.

A suitable lubricating device is known from the article "Zentralschmieranlagen in Windkraftanlagen" (Central Lubrication Systems in Wind Power Installations)(T. Biesler, "Erneuerbare Energien" June 2002). Therein, a lubricating pinion consisting, for example, of felt or covered with felt meshes with a gearing of an open tooth-wheel drive. The lubricating pinion is mounted on a hollow-drilled axis which is provided on both sides with lubricant connections. The lubricant is passed via the axis to radial bores in the lubricating pinion and escapes again on its tooth flanks. Upon adjustment of the gearing by the driving toothed wheel, the lubricating pinion rotates synchronously with it and transfers lubricant to the areas of the gearing respectively being engaged with it.

Open tooth-wheel drives for adjusting the angle of incidence of a rotor blade of a wind power installation are distinguished from most of the other open tooth-wheel drives by being only in a defined operating position which is also designated as 0° position, during the predominant part of the operating period. The angle of incidence of the rotor blade corresponding to this position is applicable for the predominant part of all wind situations. The teeth of the driving toothed wheel and the gearing which are engaged with each other in the 0° position are subject to high loads which are caused, in particular, by the occurring torsional forces of the rotor blade. Other teeth of the driving toothed wheel and the gearing are loaded in rare cases (namely, when the rotor blade is moved—in strong wind conditions—from the 0° position into a different operating position for power reduction).

The primarily loaded areas of the driving toothed wheel and the gearing are subject to a high risk of corrosion since any possibly existing lubricant on loaded tooth flanks is displaced in the course of time so that the corresponding tooth flanks concerned will mesh with each other unlubricated after some time. Due to the high forces transferred, frictional corrosion can, thus, occur. The risk of corrosion is frequently yet reinforced by climatic effects (high humidity of the air, salt concentration of the air in coastal or offshore locations). Accordingly, these areas require a targeted, regular lubrication. At the same time, however, they cannot be reached or only barely by conventional lubricating methods since they are engaged with each other most of the time.

The above described lubricating pinions or most of the alternative lubricating devices are not suitable for toothwheel drives which predominantly remain in one operating position since a large part of the lubricant provided on all teeth of the pinion would drip off unused, would soil the hub and, thus, endanger the safety of the maintenance personnel accessing the hub. With conventional lubricating devices, a targeted lubrication of the primarily loaded areas of driving toothed wheel and gearing is not possible.

The primarily loaded areas of open tooth-wheel drives for the adjustment of the angle of incidence of a rotor blade of a wind power installation can only be specifically lubricated if the rotor blade is moved from its operating position into a lubricating position to make these areas accessible for conventional lubricating methods. This can be done, for example, during the natural non-working phases of the wind power installation (e.g. in the absence of wind). Although this procedure does not cause any operational production losses, it is problematic since a production phase can be very long and there is the risk that the load-bearing lubricating film does not survive this phase, and thus, damages to the gearing will occur. This problem presents itself especially at coastal or offshore locations where it is very rarely windless. Another possibility is the introduction of specified maintenance intervals during which the installation is shut down to move the rotor blades into a lubricating position. This procedure certainly ensures sufficient lubrication of the loaded areas, but will be connected with a production loss which especially the operating companies are unwilling to accept.

BRIEF SUMMARY OF THE INVENTION

It is the object of this invention to provide a device for adjusting the angle of incidence of a rotor blade of a wind power installation with lubricating equipment which can regularly and reliably apply lubricant to the primarily loaded areas of the driving toothed wheel and the gearing without any production losses having to be accepted. It is furthermore an object of providing a method which enables lubrication of these areas during continuous operation without this resulting in any appreciable production losses.

For adjusting the angle of incidence of a rotor blade of a wind power installation, the device according to the invention comprises like known devices as well gearing provided in the area of the foot of the rotor blade which meshes with a driving toothed wheel, as well as a lubricating device. The gearing can here be provided on the rotor blade as well as on the hub of the rotor. Accordingly, the driving toothed wheel can be coupled, rotatably mounted with the hub of the rotor or the rotor blade. The gearing is preferably aligned transversely to the longitudinal axis of the rotor blade. It is, however, also conceivable that it is aligned at other angles to the longitudinal axis, as long as it is ensured that an adjustment of the angle of incidence of the rotor blade can be effected via a rotation of the driving toothed wheel.

In accordance with the invention, the lubricating device is designed such that due to a displacement of the driving toothed wheel from an operating position into a lubricating position it can be engaged with a defined point of the gearing (20) or the driving toothed wheel, respectively, previously engaged with the driving toothed wheel or the gearing, in such a way that it transfers lubricant.

Compared with the state of the art, this invention offers the advantage that, by means of this method, particularly high loaded teeth of a gearing or a driving toothed wheel can be brought from an operating position into a lubricating position, directly or indirectly in engagement with a lubricant so that these highly loaded teeth can be specifically lubricated. Thus, it will be ensured that a sufficient lubricating film always exists on these teeth which can advantageously minimize the wear of these teeth.

According to an advantageous design of the invention, the adjustment from an operating position into a lubricating position is effected via a control device.

It is conceivable that the lubricating device comprises a lubricating brush, for example. But it is also conceivable that the lubricating device comprises a grease gun or a grease nozzle. According to an advantageous embodiment of the invention, however, the lubricating device may also comprise a lubricating pinion which, in an exemplary variant of an advantageous embodiment of the invention, is arranged such that it meshes with the gearing. The lubricating pinion comprises a lubricating device which is designed such that it can produce a lubricant reserve on at least one defined lubricating tooth of the lubricating pinion. The circumferential distance of the point of engagement of the lubricating pinion with the gearing to the point of engagement of the driving toothed wheel with the gearing has been selected such that, by displacement of the driving toothed wheel, the lubricant tooth can be brought from its current position into engagement with the point of the gearing which had previously been engaged with the driving toothed wheel. During this engagement, the lubricant reserve which the lubricant device had produced on the lubricant tooth will be transferred to this point of the gearing. The position in which the driving toothed wheel (and consequently also the lubricant pinion, the gearing and the rotor blade) had been prior to the beginning of the adjustment is designated as the operating position, while the engagement position transferring the lubricant reserve is designated as the lubricating position. When the device is returned from the lubricating position into the operating position, the point of the gearing provided with lubricant will transfer a part of the lubricant to the corresponding point of the driving toothed wheel.

The operating position here designates, for the current conditions, the optimum or near optimum adjustment of the angle of incidence of the rotor blade. The lubricating position is, as a rule, an adjustment of the angle of incidence which is not optimal for the current conditions. It is possible, however, that the lubricating position of a first operating condition will present the operating position of another (second) operating condition with changed environmental conditions.

Thus, depending on the embodiment of the lubricating device, there may also be different lubricating positions and operating positions for different operating conditions. It is even conceivable that the operating position and lubricating position may even be precisely reversed for two specific operating conditions.

In a second variant according to the above described embodiments of the invention, the lubricating pinion which is rotatably mounted on the hub, does not mesh with the gearing but with the driving toothed wheel. In this case, the circumferential distance of the engagement point of the lubricating pinion with the driving toothed wheel to the engagement point of the gearing with the driving toothed wheel is selected such that, by displacement of the driving toothed wheel from the operating position into the lubricating position, the lubricating tooth is brought into engagement with the point of the driving toothed wheel which was engaged with the gearing before. During this engagement, the lubricating reserve which the lubricating device produced on the lubricating tooth is transferred to this point of the driving toothed wheel. When the device is returned from the lubricating position into the operating position, the point of the driving toothed wheel, thus provided with lubricant, will transfer a part of the lubricant to the corresponding point of the gearing. This arrangement offers the advantage that any random tooth of the gearing can be lubricated with the same minor displacement.

A device according to both variants will render it possible to provide specific areas of the driving toothed wheel and the gearing with lubricant in a targeted manner and regularly, during the continuous operation, by moving the device from the operating position into the lubricating position. Due to the defined circumferential distance of the point of engagement of the lubricating pinion to the point of engagement of the driving toothed wheel with the gearing, it will be ensured that the areas of the driving toothed wheel and the gearing are always provided with lubricant which, in continuous operation, are engaged with each other and being subjected to high mechanical loads, irrespective of whether the current operating position is equivalent to the 0° position or whether it differs from it. The latter may be the case, for example, in phases of strong wind in which the angle of incidence of the rotor blade will be changed to reduce the rotor speed and to protect the wind power installation from damage.

During the lubricating phase—i.e. the displacement of the driving toothed wheel from the operating position into the lubricating position and back again into the operating position—the angle of incidence of the rotor blade will change. The concomitant change of the approach flow of the rotor blade can result in a reduction of the rotor speed and the output of the wind power installation. Fluctuations in the output of a wind power installation can result, as of a certain threshold value or, respectively, a certain duration, in an undesirable interruption of the input to network.

In a preferred embodiment, it is accordingly provided to select the circumferential distance of the point of engagement of the lubricating pinion to the point of engagement of the driving toothed wheel with the gearing such that the control device can bring the driving toothed wheel from the operating position into the lubricating position and back again into the operating condition within a period of time which is shorter than the period of time as of which fluctuations in the output would result in an interruption of the input to network of the wind power installation or, respectively, that the angle of incidence of the rotor blade changes only slightly in the lubricating position of the driving toothed wheel, in comparison with the operating position so that the reduced output occurring during the lubricating phase will be above a critical output which, if fallen below, results in an interruption of the input to network of the wind power installation. This happens by the closest possible arrangement of the lubricating pinion meshing with the gearing on the driving toothed wheel or, respectively, in the described second variant, by the closest possible arrangement of the lubricating pinion meshing with the driving toothed wheel on the gearing.

Thus, it will be ensured on the one hand that the angle of incidence of the rotor blade during the lubricating phase will only change for a short time so that it is ensured that the rotor largely maintains its speed, due to the briefness of the lubricating phase because of its mass moment of inertia and that the output of the wind power installation will decrease only insignificantly. Moreover, even with a noticeable reduction of the output during the lubricating phase, the duration of the reduction remains below the critical time as of which the input to network of the wind power installation would be interrupted.

On the other hand, this feature will take care that the minor change of the angle of incidence only results in a slighter change of the approach flow of the rotor blade and thus, its aerodynamic efficiency will change only slightly. Accordingly, the rotor's speed during the lubricating phase, independent of its duration, will change only insignificantly so that the output of the wind power installation decreases only slightly and remains above the critical power which, if fallen below, would result in a shutdown.

In a preferred embodiment, a defined point of the driving toothed wheel is engaged with a defined point of the gearing during the predominantly prevailing operating condition. This position is designated as the 0° position and is applied with the predominant part of all wind situations. Consequently, the corresponding teeth of the driving toothed wheel and the gearing are subject to the highest loads.

It is specified in a preferred embodiment that the lubricating pinion comprises a covering by an absorbent material. This material, which may be e.g. felt or a synthetic foam— serves to absorb a part of the lubricant reserve produced on the lubricating tooth and to transfer it to the gearing upon every displacement of the driving toothed wheel. It will be ensured in this manner, that even those areas of the gearing which are not or only rarely engaged with the driving toothed wheel and thus not subject to the indicated high loads will be occasionally supplied with lubricant.

It is specified, in a preferred embodiment, to surround the lubricating pinion with a covering spaced from it. The covering favors the development of a lubricant reserve on the lubricating tooth and prevents the supplied lubricant from dripping off into the surroundings and e.g. soiling the hub of the wind power installation.

It is specified, in another preferred embodiment, to design the lubricating device such that it can produce a lubricant reserve on several teeth of the lubricating pinion. It will, thus, be ensured that, during the lubricating phase, even the areas of the gearing and the driving toothed wheel will be lubricated which are adjacent to the places which had been engaged with the driving toothed wheel or the gearing before.

It is specified, in another preferred embodiment, to use grease as the lubricant. It actually has worse creep properties than e.g. lubricating oil but it provides better adhesion to the surfaces applied and does not result in soiling. Moreover, if mixed with graphite, molybdenum sulfite or similar additives, lubricating grease has better lubrication failure properties than lubricating oil.

Furthermore, in accordance with the invention, a method for the lubrication of the point of engagement of a gearing or a driving toothed wheel of a device according to the invention is provided wherein the lubrication is performed in the period of time in which the driving toothed wheel is brought from an operating position into a lubricating position and back again into an operating position.

It is specified, in a preferred embodiment, that the driving toothed wheel is brought from the operating position into the lubricating position and back again into the operating position within a period of time which is shorter than the period of time as of which fluctuations in the output can result in an interruption of the input to network of the wind power installation.

It is specified, in another preferred embodiment, that the lubrication is performed at specific regular intervals. The length of the intervals here depends on different factors, e.g. on the properties of the employed materials of gearing and driving toothed wheel, on the climatic conditions at the location or the wind conditions prevailing there. At coastal or offshore locations, for example, increased corrosion of the stressed areas can occur so that relatively short intervals with a length of e.g. less than one day may be required. With predominantly strong winds, frequently changing wind directions or locations with a tendency to gusting winds, the resulting high loads of the stressed areas may also require relatively short intervals. In contrast thereto, at locations far from the coast, at locations less prone to corrosion, or those with constant wind conditions, relatively long intervals of a length of e.g. 14 days may be sufficient.

The length of a lubricating interval can advantageously be stored as a parameter in a control device; such control device can mean not only the operating management system of the wind energy installation but also a separate control device. Storage of the lubricating interval as a parameter in a control device provides the advantage that an adjustment of the interval can be easily made depending on the location.

It is specified in another preferred embodiment that the lubrication is only performed if the wind power installation has a specific minimum output in continuous operation. This is to prevent that a reduced output occurring during the lubricating phase despite close arrangement of the lubricating pinion meshing with the gearing on the driving toothed wheel or, respectively, in the described second variant, despite close arrangement of the lubricating pinion meshing with the driving toothed wheel on the gearing—will be above the critical output which, if dropped below, would result in an interruption of the input to network of the wind power installation.

In practice, this means that lubrication is carried out only as of a specific wind velocity. With wind velocities below that, the output reduction to be accepted during the lubricating phase—possibly despite the indicated design measures—might result in the critical output being dropped below and the wind power installation being disconnected from the input to network. After termination of the lubricating phase, the installation would then first reach the required minimum output again before it can again input to the network so that earnings reductions would result.

BRIEF DESCRIPTION OF THE DRAWINGS

In the following, different embodiments of the invention are to be, explained in more detail by way of example on the basis of drawings. It is shown in FIG. 1 a wind power installation in a front view.

DETAILED DESCRIPTION OF THE INVENTION

Figure 1:
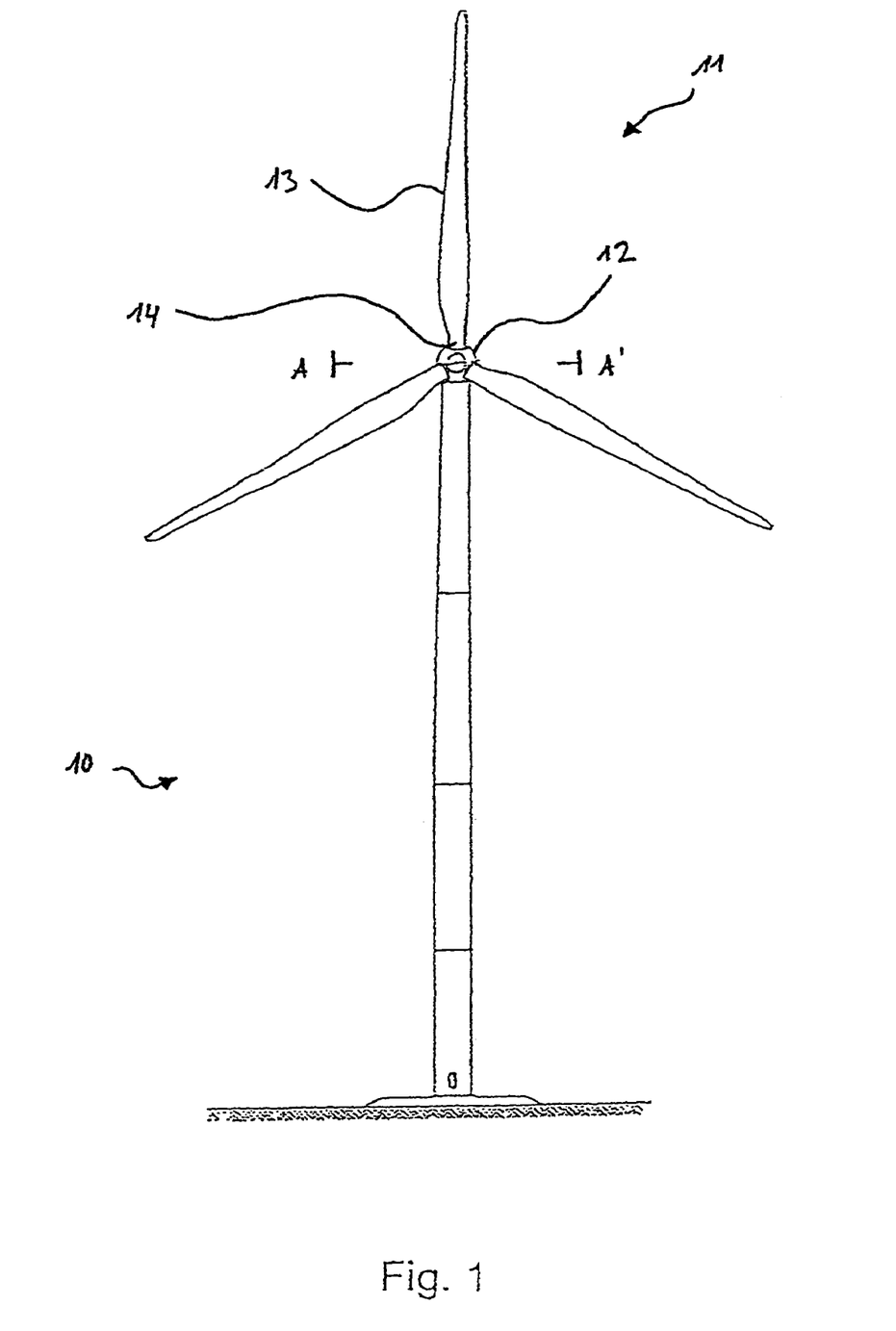

FIG. 1 shows a wind power installation 10 with a rotor 11, a hub 12, as well as a rotor blade 13 which is provided via its blade foot 14 on the hub 12.

Figure 2:
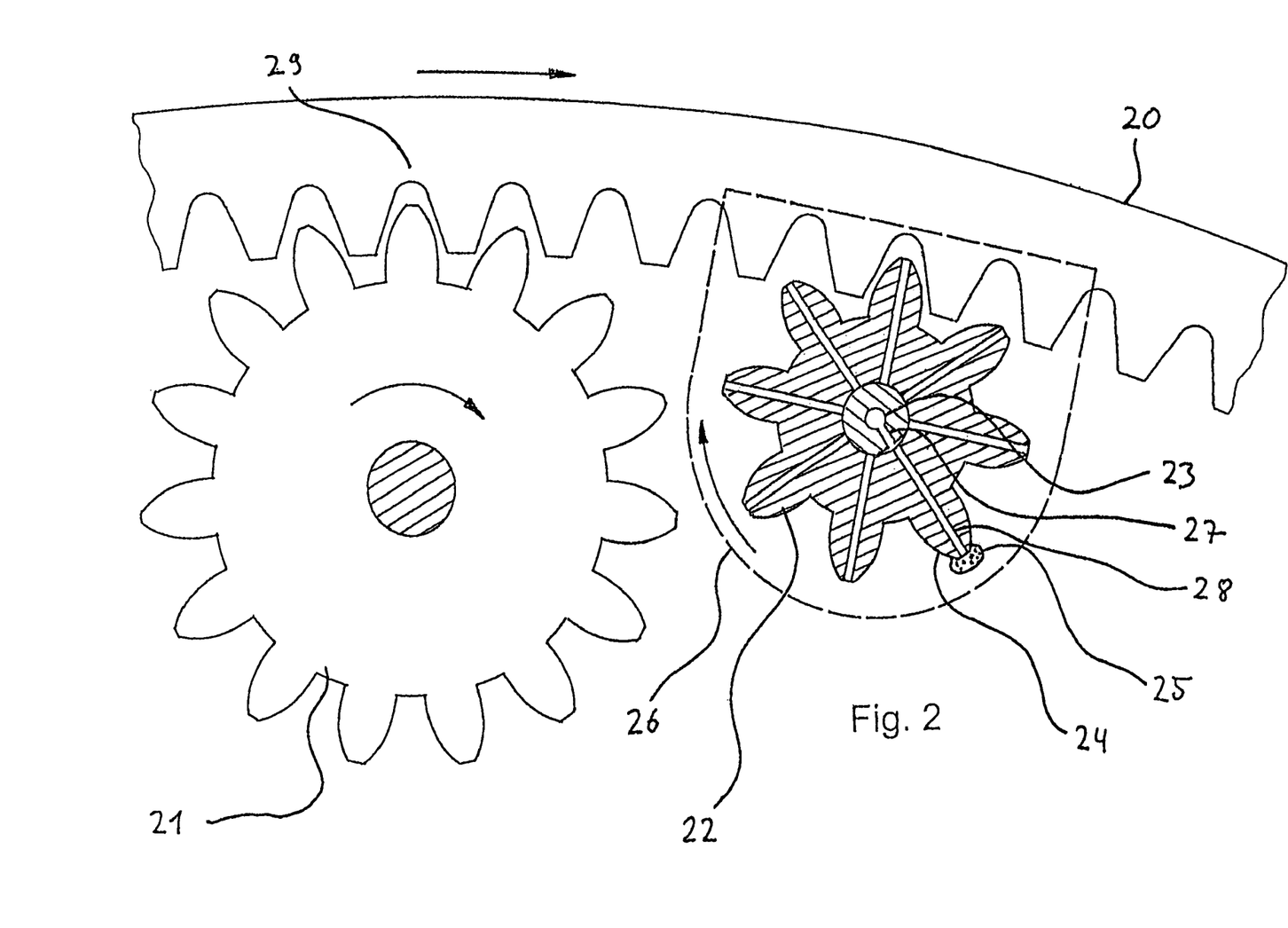
FIG. 2 a section according to line A-A' in FIG. 1.

FIG. 2 shows, in a sectional view, a device for adjusting the angle of incidence of a rotor blade of a wind power installation, with a gearing 20, a driving toothed wheel 21, a lubricating pinion 22, a lubricating device 23, a lubricating tooth 24, a lubricant reserve 25, a covering 26 surrounding the lubricating pinion 22, a radial bore 27 in the axis of the lubricating pinion 22, a radial bore 28 in the lubricating tooth 24 and an area 29 of the gearing 20. The lubricating pinion 22 comprises additional radial bores, according to the number of its teeth.

The gearing 20 is provided in the area of the blade foot 14 of the rotor blade 13, transversely to the longitudinal axis of the rotor blade 13. The driving toothed wheel 21 is rotatably mounted on the hub 12 of the wind power installation 10, meshes with the gearing 20 and thus rotates, upon displacement, the angle of incidence of the rotor blade 13. The driving toothed wheel 21 is driven via an axis, not shown, by an electric motor, not shown, and will be arrested by a brake, also not shown, which is provided on the axis of the driving toothed wheel 21. The lubricating pinion 22 is also rotatably mounted on the hub 12 of the wind power installation 10 and meshes with the gearing 20. The lubricating device 23 delivers—via the radial bore 27 in the axis of the lubricating pinion 22 lubricant into the radial bore 28 in the lubricating tooth 24 at the outer end of which the lubricant escapes and forms a lubricant reserve 25. The formation of the lubricant reserve 25 is favored by the covering 26 which surrounds the lubricating pinion 22 in a spaced manner and prevents the lubricant from escaping at the outer end of the bore 28 and dripping off.

The distance between driving toothed wheel 21 and lubricating pinion 22 is selected such that, with a given number of teeth of gearing 20, driving toothed wheel 21 and lubricating pinion 22, as well as with a given angular position of the radial bore 27, upon rotation of the driving toothed wheel 21 for lubricating purposes, the lubricating tooth 24 engages with the area 29 of the gearing 20 and thereby deposits the lubricant reserve 25 on the corresponding tooth flanks, with this area having before been engaged with the driving toothed wheel 21, as presented in FIG. 2.

The radial bore 27 in the axis of the lubricating pinion 22 is horizontally milled at its outer end so that lubricant can also enter into the radial bore 28 in the lubricating tooth 24 even if the two bores are not exactly concentric with each other.

In deviation from the embodiment presented in FIG. 2, the axis of the lubricating pinion 22 can have more than only one radial bore. In this embodiment, the lubricating device 23 produces on several teeth of the lubricating pinion 22 a lubricant reserve so that, during the lubricating phase, lubricant can be applied to a wider area of the gearing 20.

Figure 3:
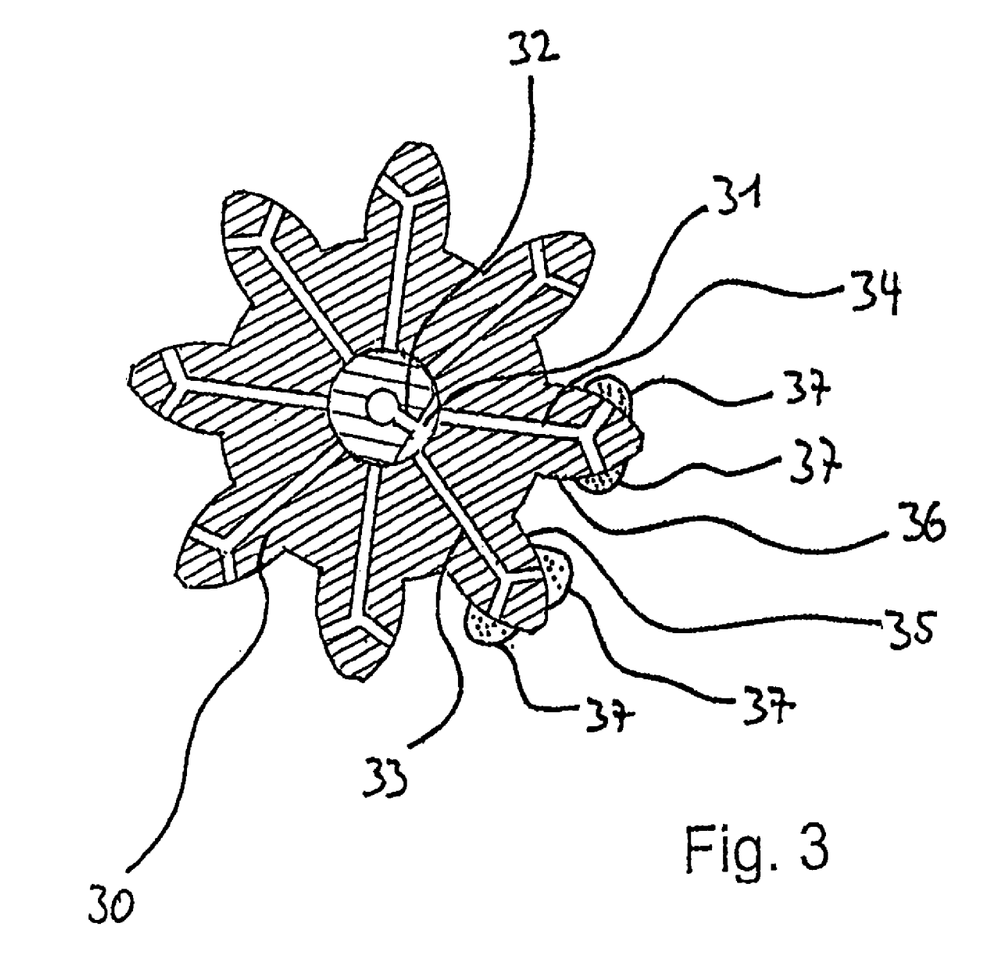
FIG. 3 an alternative embodiment of a detail from FIG. 2.

FIG. 3 shows alternative embodiments of the lubricating pinion 21 presented in FIG. 2. As compared to the latter, the radial bores of the lubricating pinion 30 are bifurcated at their distal end so that lubricant does not escape at the tip of the lubricating tooth, but on its flanks.

Moreover, the milled area 31 of bore 32 in the axis of the lubricating pinion 30 is dimensioned such that, if e.g. the radial bores 33 and 34 of the lubricating pinion 30 are in the same angle to the bore 32, lubricant can enter into both bores 33, 34. The lubricant escapes—due to the bifurcation of these bores, on the flanks of the corresponding lubricating teeth 35 and 36 and forms the lubricant reserves 37 there.

Figure 4:
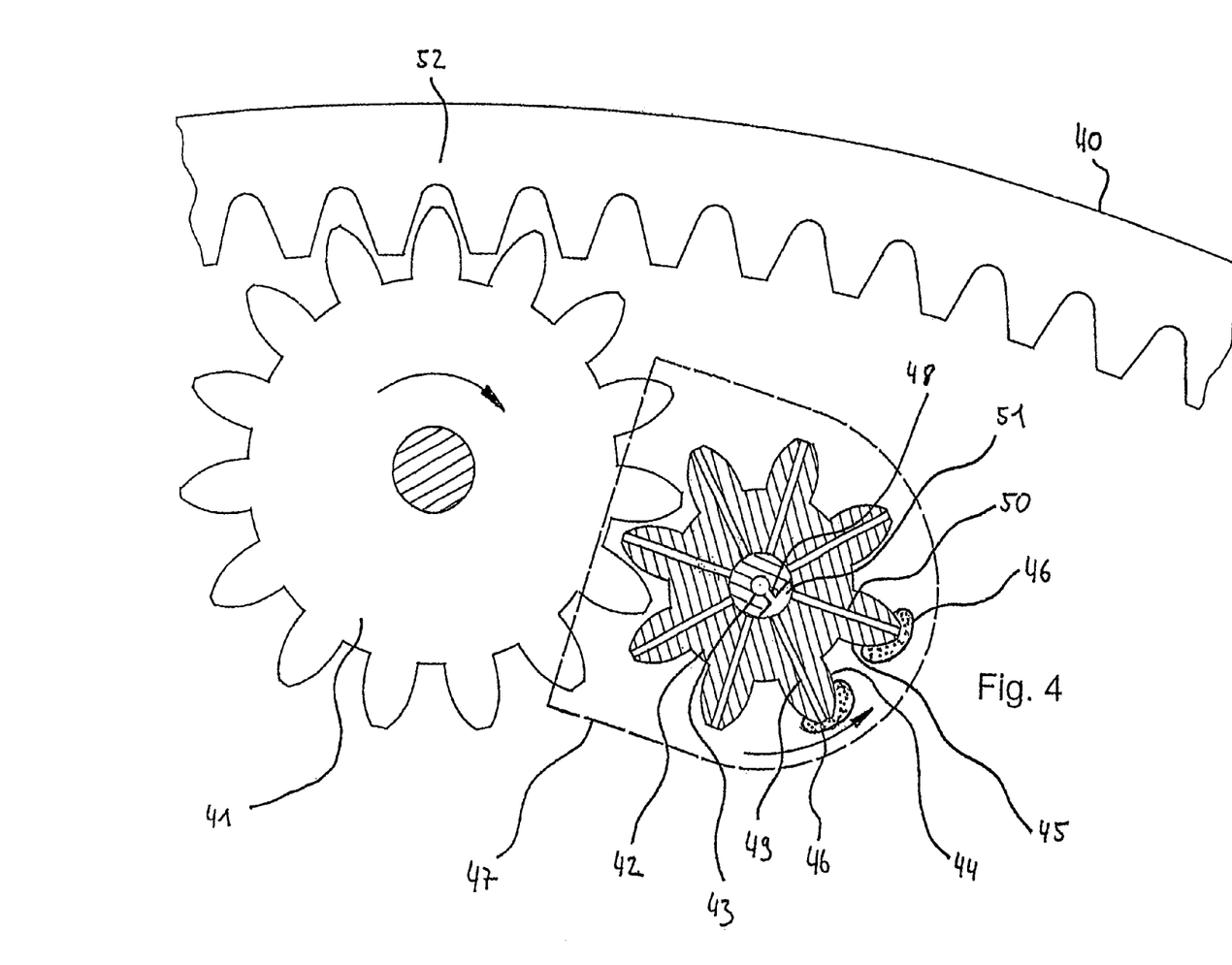
FIG. 4 a section according to line A-A' in FIG. 1 in another embodiment than in FIG. 2.

FIG. 4 shows, in a different embodiment than in FIG. 2, a device for the adjustment of the angle of incidence of a rotor blade of a wind power installation with a gearing 40, a driving toothed wheel 41, a lubricating pinion 42, a lubricating device 43, the lubricating teeth 44 and 45, the lubricant reserves 46, a covering 47 surrounding the lubricating pinion 42, a radial bore 48 in the axis of the lubricating pinion 42, the radial bores 49 and 50 in the lubricating teeth 44 and 45, and an area 52 of the gearing 40. The lubricating pinion 42 comprises additional radial bores according to the number of its teeth.

The boring 48 in the axis of the lubricating pinion 42 comprises a milled area 51 which is dimensioned such that, if for example, the radial bores 49 and 50 of the lubricating pinion 42 are at the same angle to the bore 48, lubricant can enter into both bores, escape at the tips of the corresponding lubricating teeth 44 and 45 and there form the lubricant reserves 46.

In this embodiment, the lubricating pinion 42 is mounted on the hub 12 of the wind power installation 10 such that it meshes with the driving toothed wheel 41, instead of with the gearing 40. In this case, the distance between gearing 40 and the lubricating pinion 42, in turn, is selected such that, with a given number of teeth of gearing 40, driving toothed wheel 41 and the lubricating pinion 42, as well as with the given angular position of the radial bore 48—upon rotation of the driving toothed wheel 41 for lubricating purposes, the lubricating teeth 44 and 45 engage with the area of the driving toothed wheel 41 which before had been engaged with the gearing 40 and thereby deposit the lubricant reserves 46 on the corresponding tooth flanks of the driving toothed wheel 41. Only when the driving toothed wheel 41 rotates back into its starting position, these lubricant reserves will be deposited on the corresponding tooth flanks in the area 51 of gearing 40.

The invention claimed is:

1. A device for targeted adjustment of an angle of incidence of a rotor blade (13) that is rotatably mounted, at a foot (14) thereof, on a hub (12) of a rotor (11) of a wind power installation (10), said device comprising a gearing (20, 40), a driving toothed wheel (21, 41) that meshes with said gearing (20, 40), and a lubricating device, which comprises a lubricating pinion (22, 42) meshing with the gearing (20) or the driving toothed wheel (41) and provides a lubricant reserve (25, 46) on at least one defined lubricating tooth (24, 44, 45) of the lubricating pinion (22, 42), wherein the lubricating device is configured such that, due to a temporary displacement of the driving toothed wheel (21, 41) from an operating position into a lubricating position, the lubricating device can be engaged with a defined point of the gearing (20) or the driving toothed wheel (41), respectively previously engaged with the driving toothed wheel (21) or the gearing (20, 40), so as to transfer lubricant, and wherein displacement from an operating position into a lubricating position takes place via a control device, this control device being configured to effect the displacement during continuous operation of the wind power installation.

2. The device according to claim 1, wherein a circumferential distance of a point of engagement of the lubricating pinion (22, 42) to a point of engagement of the driving toothed wheel (21, 41) with the gearing (20, 40) is selected such that
   a) the control device can bring the driving toothed wheel (21, 41) from the operating position into the lubricating position and back again into the operating position within a period of time which is shorter than a period of time as of which fluctuations in the output result in an interruption of the input to network of the wind power installation (10), and/or b) the angle of incidence of the rotor blade (13) in the lubricating position of the driving toothed wheel changes only so slightly as compared to the operating position that a reduced output ensuing in the lubricating position will be above a critical output which, if fallen below, results in an interruption of the input to network of the wind power installation (10).

3. The device according to claim 1, wherein a defined point of the driving toothed wheel (21, 41) is engaged with a defined point of the gearing (20, 40) during a predominantly prevailing operating position.

4. The device according to claim 1, wherein the lubricating pinion (22, 42) comprises a coating of an absorbent material.

5. The device according to claim 1, wherein the lubricating pinion (22, 42) is surrounded by a covering (26, 47), said covering being spaced from the lubricating pinion.

6. The device according to claim 1, wherein the lubricating device (23, 43) is designed to produce a lubricant reserve (25, 46) on several teeth of the lubricating pinion (22, 42).

7. The device according to claim 1, wherein the lubricant used consists of grease.

8. A method for lubrication of a point of engagement of a gearing (20) or a driving toothed wheel (41) with a driving toothed wheel (21) or a gearing (40) of a device for targeted adjustment of an angle of incidence of a rotor blade (13) that is rotatably mounted, at a foot (14) thereof, on a hub (12) of a rotor (11) of a wind power installation (10), said device comprising a gearing (20, 40), a driving toothed wheel (21, 41) that meshes with said gearing (20, 40), and a lubricating device, which comprises a lubricating pinion (22, 42) meshing with the gearing (20) or the driving toothed wheel (41) and provides a lubricant reserve (25, 46) on at least one defined lubricating tooth (24, 44, 45) of the lubricating pinion (22, 42), wherein the lubricating device is configured such that, due to a temporary displacement of the driving toothed wheel (21, 41) from an operating position into a lubricating position, the lubricating device can be engaged with a defined point of the gearing (20) or the driving toothed wheel (41), respectively previously engaged with the driving toothed wheel (21) or the gearing (20, 40), so as to transfer lubricant, wherein displacement from an operating position into a lubricating position takes place via a control device, this control device being configured to effect the displacement during continuous operation of the wind power installation; and wherein the lubrication is performed during continuous operation of the wind power installation and within a period of time in which the driving toothed wheel (21, 41) is brought from an operating position into a lubricating position and back again into an operating position.

9. The method according to claim 8, wherein the driving toothed wheel (21, 41) is brought from the operating position into the lubricating position and back again into the operating position within a period of time which is shorter than the period of time as of which fluctuations in an output result in an interruption of the input to network of the wind power installation (10).

10. The method according to claim 8, wherein the lubrication is performed at specific regular intervals.

11. The method according to claim 8, wherein the lubrication is only performed if the wind power installation (10) has a specific minimum output in continuous operation.

12. A wind power installation including a device for targeted adjustment of an angle of incidence of a rotor blade (13) that is rotatably mounted, at a foot (14) thereof, on a hub (12) of a rotor (11) of a wind power installation (10), said device comprising a gearing (20,40), a driving toothed wheel (21, 41) that meshes with said gearing (20, 40), and a lubricating device, which comprises a lubricating pinion (22, 42) meshing with the gearing (20) or the driving toothed wheel (41) and provides a lubricant reserve (25, 46) on at least one defined lubricating tooth (24, 44, 45) of the lubricating pinion (22, 42), wherein the lubricating device is configured such that, due to a temporary displacement of the driving toothed wheel (21, 41) from an operating position into a lubricating position, the lubricating device can be engaged with a defined point of the gearing (20) or the driving toothed wheel (41), respectively previously engaged with the driving toothed wheel (21) or the gearing (20, 40), so as to transfer lubricant, wherein displacement from an operating position into a lubricating position takes place via a control device, this control device being configured to effect the displacement during continuous operation of the wind power installation.

* * * * *